US012633966B2

(12) United States Patent
Nilsson et al.

(10) Patent No.: US 12,633,966 B2
(45) Date of Patent: May 19, 2026

(54) GROUPING IN SERIES-CONNECTED RADIOS

(71) Applicant: Telefonaktiebolaget LM Ericsson (publ), Stockholm (SE)

(72) Inventors: Magnus Nilsson, Lund (SE); Peter Jakobsson, Lund (SE); Jan Curt Gustaf Celander, Malmö (SE); Hans Oskar Martin Isberg, Lund (SE); Torsten Carlsson, Lund (SE); Magnus Sandgren, Staffanstorp (SE); Dandan Hao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 665 days.

(21) Appl. No.: 17/920,079

(22) PCT Filed: Apr. 23, 2020

(86) PCT No.: PCT/EP2020/061364
§ 371 (c)(1),
(2) Date: Oct. 20, 2022

(87) PCT Pub. No.: WO2021/213659
PCT Pub. Date: Oct. 28, 2021

(65) Prior Publication Data
US 2023/0188180 A1      Jun. 15, 2023

(51) Int. Cl.
*H04B 7/024* (2017.01)
*H04L 5/00* (2006.01)
(Continued)

(52) U.S. Cl.
CPC ........... *H04B 7/024* (2013.01); *H04L 5/0051* (2013.01); *H04W 48/08* (2013.01); *H04W 74/0833* (2013.01)

(58) Field of Classification Search
CPC ...... H04B 7/024; H04B 7/0695; H04B 7/088; H04L 5/0051; H04W 48/08; H04W 74/0833
(Continued)

(56) References Cited

U.S. PATENT DOCUMENTS

| | | | |
|---|---|---|---|
| 2012/0178468 A1* | 7/2012 | Jeong | H04W 36/324 455/452.1 |
| 2018/0139036 A1* | 5/2018 | Islam | H04L 5/0048 |

(Continued)

FOREIGN PATENT DOCUMENTS

| | | |
|---|---|---|
| WO | 2020019155 A1 | 1/2020 |
| WO | 2020067829 A1 | 4/2020 |

OTHER PUBLICATIONS

3GPP, "3rd Generation Partnership Project; Technical Specification Group Radio Access Network; NR; Base Station (BS) radio transmission and reception (Release 16)", 3GPP TS 38.104 V16.3.0, Mar. 2020, 1-258.

(Continued)

*Primary Examiner* — Rownak Islam
(74) *Attorney, Agent, or Firm* — Murphy, Bilak & Homiller, PLLC

(57) ABSTRACT

A distributed wireless system comprises a controlling node (20) and two or more antenna processing nodes (22) communicatively coupled to the controlling node (20) but spatially separated from each other and from the controlling node (20). A method in the controlling node (20) comprises controlling (1110) a first subset of the antenna processing nodes (22) to transmit synchronization signal blocks, SSBs, having a first SSB identifier, the first subset including one or more of the antenna processing nodes, and controlling (1120) a second subset of the antenna processing nodes (22) to transmit SSBs having a second SSB identifier, the second (Continued)

subset including one or more of the antenna processing nodes (22) and being disjoint with the first subset.

15 Claims, 9 Drawing Sheets

(51) Int. Cl.
H04W 48/08 (2009.01)
H04W 74/0833 (2024.01)

(58) Field of Classification Search
USPC ........................................................ 370/329
See application file for complete search history.

(56) References Cited

U.S. PATENT DOCUMENTS

2019/0349162 A1    11/2019  Qi et al.
2020/0059970 A1*    2/2020  Islam .................. H04W 56/001

OTHER PUBLICATIONS

3GPP , "3rd Generation Partnership Project; Technical Specification Group Radio Access Network; NR; Radio Resource Control (RRC) protocol specification (Release 15)", 3GPP TS 38.331 V15.7.0, Sep. 2019, 1-527.

CAICT , "Discussion on extensions of SSBs for inter-IAB-node discovery and measurements", 3GPP TSG RAN WG1 #96, R1-1902921, Athens, Greece, Feb. 25-Mar. 1, 2019, 1-3.

Dahlman, Erik , et al., "5G NR The Next Generation Wireless Access Technology", Academic Press, Elsevier Ltd., 2018, 469 pages.

IEEE Computer Society , "IEEE Std 802.3-2018, Section 4", IEEE Standard for Ethernet, Revision of IEEE Std 802.3-2015, IEEE New York, NY, Jun. 14, 2018, 1-909.

Interdonato, Giovanni , "Signal Processing Aspects of Cell-Free Massive MIMO", Linkoping Studies in Science and Technology Licentiate Thesis No. 1817, Licentiate Thesis, Linkoping University, Sep. 21, 2018, 49 pages.

Samsung , "Support of SSBs for IAB Node Discovery and Measurement", 3GPP TSG RAN WG1 #96, R1-1902269, Athens, Greece, Feb. 25-Mar. 1, 2019, 1-6.

* cited by examiner

= SERIAL LINK/HOP

= APU 22

= CPU 20

10m

10m

——— = SERIAL LINK/HOP

✕ = APU 22

☐ = CPU 20

FIG. 9

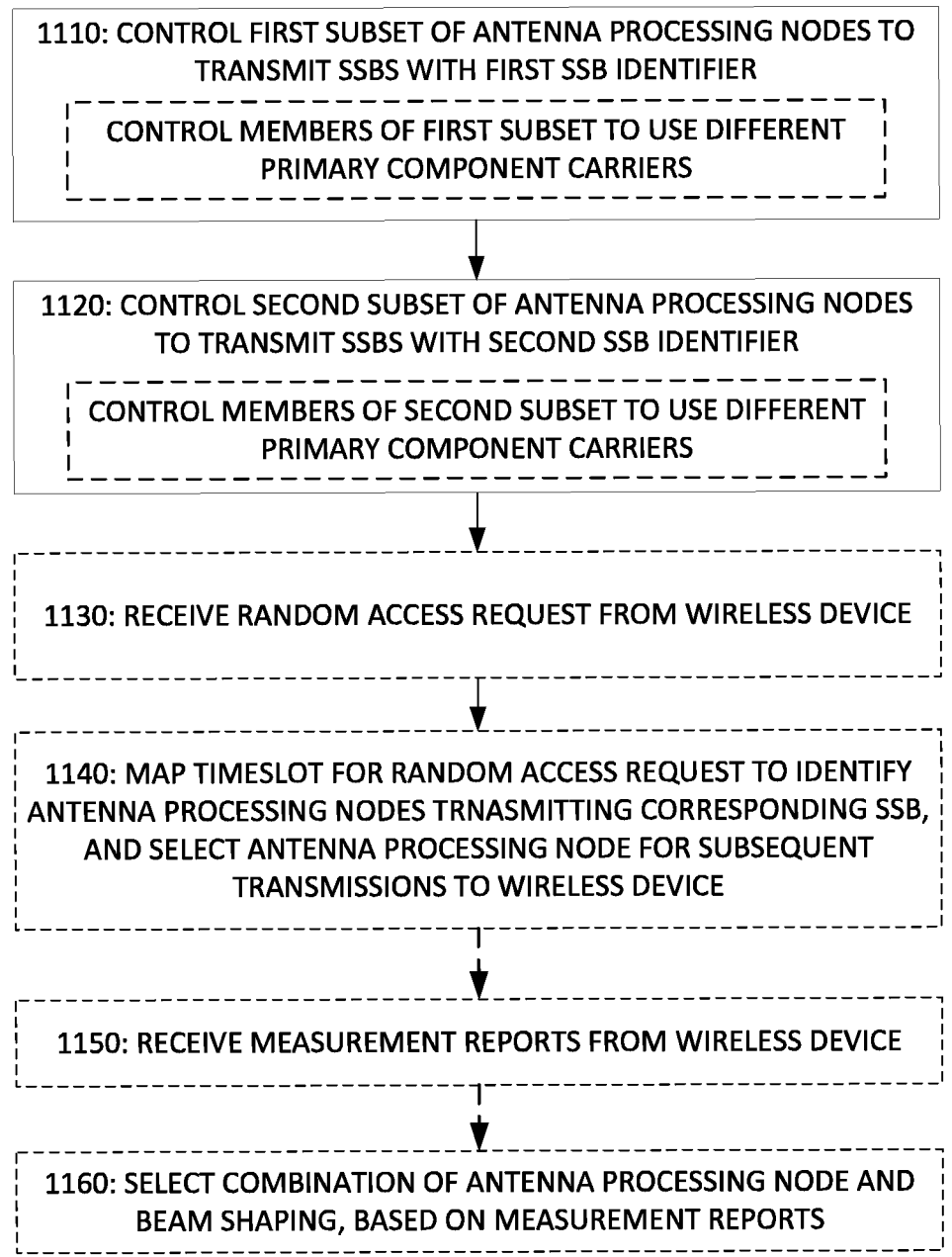

1110: CONTROL FIRST SUBSET OF ANTENNA PROCESSING NODES TO TRANSMIT SSBS WITH FIRST SSB IDENTIFIER

CONTROL MEMBERS OF FIRST SUBSET TO USE DIFFERENT PRIMARY COMPONENT CARRIERS

1120: CONTROL SECOND SUBSET OF ANTENNA PROCESSING NODES TO TRANSMIT SSBS WITH SECOND SSB IDENTIFIER

CONTROL MEMBERS OF SECOND SUBSET TO USE DIFFERENT PRIMARY COMPONENT CARRIERS

1130: RECEIVE RANDOM ACCESS REQUEST FROM WIRELESS DEVICE

1140: MAP TIMESLOT FOR RANDOM ACCESS REQUEST TO IDENTIFY ANTENNA PROCESSING NODES TRNASMITTING CORRESPONDING SSB, AND SELECT ANTENNA PROCESSING NODE FOR SUBSEQUENT TRANSMISSIONS TO WIRELESS DEVICE

1150: RECEIVE MEASUREMENT REPORTS FROM WIRELESS DEVICE

1160: SELECT COMBINATION OF ANTENNA PROCESSING NODE AND BEAM SHAPING, BASED ON MEASUREMENT REPORTS

*FIG. 11*

GROUPING IN SERIES-CONNECTED RADIOS

TECHNICAL FIELD

The present disclosure generally relates to wireless systems in which a central processing unit for a base station is coupled to a series of spatially separated transmitting and receiving antenna points via serial interfaces. The present disclosure relates more particularly to techniques for facilitating the selection of one or several of the antenna points for serving a user equipment.

BACKGROUND

The term "cell-free massive MIMO" has been used to refer to a massive Multiple-Input Multiple-Output (MIMO) system where some or all of the transmitting and receiving antennas for a base station are geographically distributed, apart from the base station. Each of the transmitting and receiving points may be referred to as an "antenna point," "antenna processing node," or "antenna processing unit." These terms may be understood to be interchangeable for the purposes of the present disclosure, with the abbreviation "APU" being used herein. These APUs are communicatively coupled to and controlled by a controlling node, which is spatially separate from some or all of the APUs, may be referred to interchangeably as a "central processing node" or "central processing unit"—the abbreviation "CPU" is used herein.

FIG. 1 provides a conceptual view of a cell-free massive MIMO deployment, comprising a CPU 20 connected to several APUs 22, via serial links 10. As seen in the figure, each of several user equipments (UEs) 115 may be surrounded by one or several serving APUs 22, all of which may be attached to the same CPU 20, which is responsible for processing the data received from and transmitted by each APU. Each UE 115 may thus move around within this system without experiencing cell boundaries.

Systems described herein include at least CPU and two or more APUs spatially separated from each other and from the CPU. These systems, which may be considered examples of cell-free massive MIMO deployments, will be called distributed wireless systems herein. FIGS. 2 and 3 provide other views of example deployments of distributed wireless systems. In this scenario shown in FIG. 2, multiple APUs 22 are deployed around the perimeter of a room, which might be a manufacturing floor or a conference room, for example. Each APU 22 is connected to the CPU 20 via a "strip," or "stripe." More particularly, the CPU 20 in this example deployment is connected to two such stripes, each stripe comprising a serial concatenation of several (10, in the illustrated example) APUs 22. FIG. 3 shows an two-dimensional model of a factory floor with densely populated APUs 22 connected to the CPU 20 via several such "stripes" As a general matter, the CPU 20 can target a UE anywhere in the room by controlling one or several APUs 22 that are closest to the UE to transmit signals to and receive signals from the UE. In this example deployment, the APUs are spaced at 10 meters, in both x- and y-directions, which means that a UE is never more than about 7 meters away from one (or several) APUs, in the horizontal dimension.

It will be appreciated that the distribution of base station antennas into APUs as shown in FIGS. 1-3 can provide for shorter distances between the base station antennas and the antenna(s) for any given UE served by the base station, in many scenarios. This will be an enabler for the use of higher carrier frequencies, and thereby higher modulation/information bandwidths, both of which are key expectations for fifth-generation (5G) wireless networks. More particularly, new frequency bands in the millimeter-wave (mmW) range are introduced for 5G. Even higher frequency bands are envisioned for 6G, with operating frequencies up to several hundred GHz. These high frequencies present challenges in radio propagation but are well suited for cell-free massive MIMO deployments, since all users can be very close to a base station in such systems. Wall penetration is bad at these high frequencies, which is beneficial if trying to build an isolated indoor system. A key advantage of these higher frequency bands is that there are several GHz of contiguous frequency bands available. This enables very high UE bitrates, e.g., in the tens of Gbps, or higher.

Another requirement of 5G networks is that they support a high quality-of-service (QoS). To achieve this, it is necessary that the radio link between the mobile/device/machine (UE) and the base station be highly reliable and support low-latency communications. This is especially the case for industrial scenarios, for example, where mission-critical real-time communication is needed for communications with or between machines equipped with devices. Here again, the type of network discussed herein is seen as a good candidate for ultra-reliable networks, since they can provide more than one radio link between the UE and the infrastructure network.

SUMMARY

A distributed wireless system according to embodiments described herein comprises a controlling node and two or more antenna processing nodes communicatively coupled to the controlling node but spatially separated from each other and from the controlling node. An example method in the controlling node comprises controlling a first subset of the antenna processing nodes to transmit synchronization signal blocks (SSBs) having a first SSB identifier, the first subset including one or more of the antenna processing nodes, and controlling a second subset of the antenna processing nodes to transmit SSBs having a second SSB identifier, the second subset including one or more of the antenna processing nodes and being disjoint with the first subset.

An example controlling node apparatus according to embodiments described herein, for use in a distributed wireless system that comprises the controlling node and two or more antenna processing nodes communicatively coupled to the controlling node but spatially separated from each other and from the controlling node, comprises interface circuitry configured to send information to and receive information from a plurality of antenna processing nodes, as well as processing circuitry operatively coupled to and configured to control the interface circuitry. The processing circuitry is configured to control a first subset of the antenna processing nodes to transmit SSBs having a first SSB identifier, the first subset including one or more of the antenna processing nodes, and to control a second subset of the antenna processing nodes to transmit SSBs having a second SSB identifier, the second subset including one or more of the antenna processing nodes and being disjoint with the first subset.

Variations of the above-summarized method and apparatus are described in detail below, as are corresponding systems, computer program products, and computer-readable media.

Benefits of the techniques and apparatus disclosed herein include that they facilitate the locating of the APU having the lowest pathloss to each UE making a random access attempt in a distributed wireless system. Using these techniques, the UE is able to direct its beamforming towards the APU with lowest path loss and the CPU will select the best beam from the selected APU to serve the UE. This will result in lower path loss for each UE, and thus faster and more reliable communication. In addition, overall system capacity is improved due to lower interference level.

Additional details and further advantages are described below, and illustrated in the attached figures.

BRIEF DESCRIPTION OF THE FIGURES

FIG. 9 shows portions of an example signaling during one SSB period of 20 milliseconds.

FIG. 11 is a process flow diagram illustrating an example method carried out by a controlling node, according to some embodiments.

DETAILED DESCRIPTION

There are several possible approaches for implementing the interconnections between the CPU in a distributed wireless system and the APUs that it controls. One approach is to implement the interconnections between the CPUs and the APUs as a high-speed digital interface, e.g., such as a high-speed Ethernet connection. With this approach, information to be transmitted by a given APUs is sent from the CPU to the APU as digital baseband information. This digital baseband information is then up-converted to a radiofrequency (RF) signal in the APU, for transmission over the air. In the other direction, RF signals received from a UE are downconverted in the APU and converted to digital form before being sent over the digital link to the CPU, for further processing. Some concerns that arise with this approach include power consumption and heat dissipation. The high-speed digital serial interfaces required for this approach may dominate the power consumption needs for the APUs; typically this power will be supplied to the APUs through the serial links themselves, which means that the CPU may be providing the DC power for all of the APUs in such a system.

Figure 2:
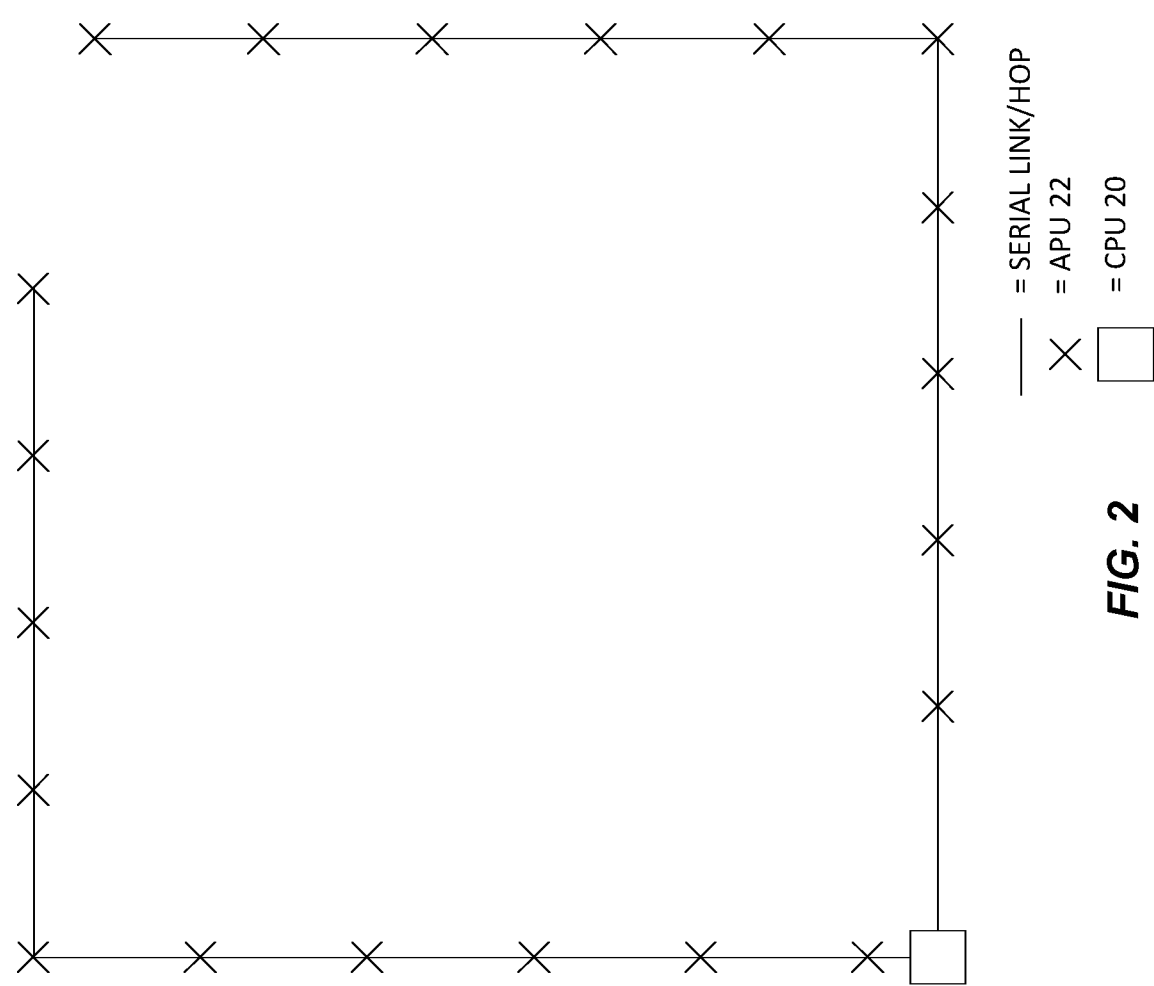
FIG. 2 illustrates an example deployment of a distributed wireless system.

Another approach is to implement each link, or "hop," along the stripes shown in FIG. 2 as a dielectric waveguide that carries a high-frequency RF signal (e.g., a millimeter-wave signal). With this approach, the CPU can provide an already modulated and upconverted RF signal to each APU, for transmission by the APU when required. As a general matter, the term "dielectric waveguide" as used herein may include any sort of dielectric waveguide, which would include such things as conventional RF waveguides, which are metallic pipes and in which the dielectric substance within the pipe is often simply air. However, more cost-effective solutions have been developed for short- and medium-range applications; these solutions may comprise an inexpensive plastic dielectric that is metallized, e.g., so as to form a "pipe" surrounding the dielectric material or so as to form two parallel plates separated by the dielectric material. These inexpensive dielectric waveguides may provide suitable performance over links that are several meters, or even dozens of meters, long.

An advantage of this approach is that the RF-based interface circuitry may consume less power than the serial digital interfaces described above. Less processing power is required in each APU as well, further reducing the power consumption of the system.

The following detailed description is focused on the second approach described above, i.e., on systems where a CPU is connected to multiple APUs via a series of dielectric waveguides. However, the inventive techniques described herein are not limited to such a system.

Figure 4:
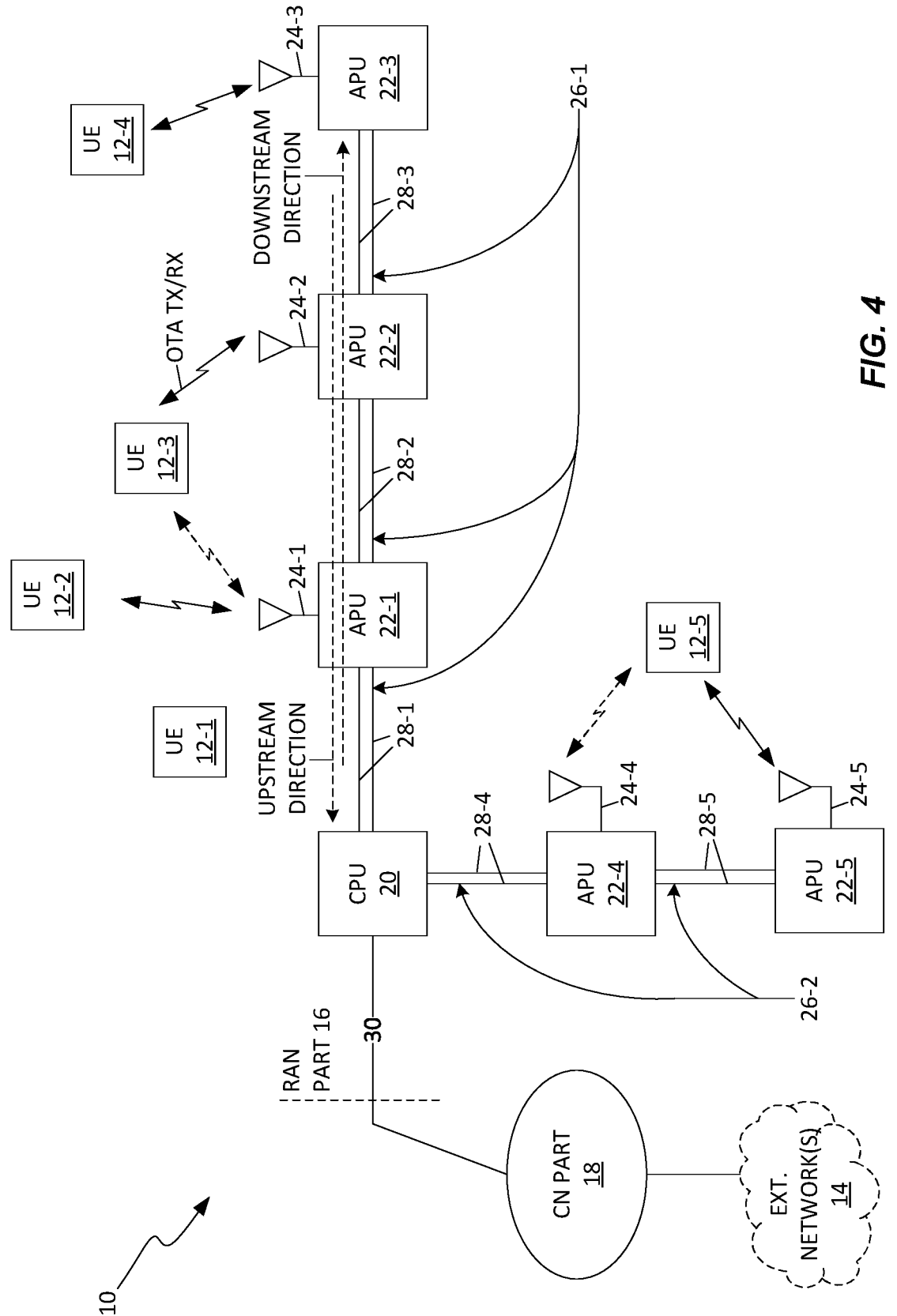
FIG. 4 illustrates an example distributed transmission system forming at least part of a radio access network (RAN), connected to a core network (CN).

FIG. 4 is a block diagram of one embodiment of a wireless communication network 10 ("network 10") that includes a dielectric waveguide-based distributed radio system configured to provide one or more types of communications services to User Equipments (UEs) 12, according to some embodiments of the presently disclosed invention. For example, the network 10 operates as an access network, providing access to one or more external networks 14, such as the Internet.

While FIG. 4 depicts five UEs 12-1 through 12-5, no limitation attends the depiction, as the number of UEs 12 connected to the network 10 varies over time. As with the UEs 12, FIG. 4 and other ones of the accompanying figures may depict elements that are the same or at least broadly similar for purposes of discussion using suffixed reference numbers. However, this specification refers to suffixes only when necessary for clarity. Thus, the reference number "12" without suffixing may be used to refer to a given UE in singular form, or to given UEs in plural form. The same holds for other drawing reference numbers depicted with suffixing in any of the figures.

The term "UE" encompasses essentially any type of wireless communication apparatus that is configured to make use of the network 10—i.e., to communicate via wireless attachment to the network 10. Example types or categories of UEs include smartphones, feature phones, laptops, tablets, or other personal computing devices. Other examples include Machine Type Communication (MTC) devices or Internet-of-Things (IoT) devices, such as sensors and controllers. The UEs 12 served by the network 10 may be of the same type or a mix of various types and the mix may change with time. One or more UEs 12 served by the network 10 may be embedded, e.g., in a vehicle, and one or more may be stationary. For example, the network 10 may be an indoor deployment targeting UEs 12 within a building or may be outdoors in an urban area with foot traffic and vehicle traffic.

The network 10 in an example embodiment is configured according to Third Generation Partnership Project (3GPP) specifications. In at least one embodiment, the network 10 is a Fifth Generation (5G) New Radio (NR) network, according to the corresponding 3GPP specifications. See the specifications referred to as 3GPP Release 15 and newer. However, the architecture of the network 10 has wider applicability than 5G NR deployments and 5G NR stands only as one example.

Different "parts" of the network 10 include a Radio Access Network (RAN) part 16, also referred to as the RAN 16, and a Core Network (CN) part 18, also referred to as the CN 18. While not necessarily germane to the specific techniques described herein, the CN 18 provides authentication, mobility-management, and external-network interfacing functions, in support of providing communication services to the UEs 12, while the RAN 16 provides the air interface(s) by which the UEs 12 are "connected" to the network 10.

The illustrated RAN 16 includes a central processing unit (CPU) 20 and one or more antenna processing units (APUs) 22, e.g., APUs 22-1 through 22-5. As noted above, a CPU 20 might also be referred to as a "controlling node," while an APU 22 may be referred to as an antenna processing node. A characteristic arrangement contemplated herein is that a CPU 20 and one or more APUs 22 form a "chain" 26 of serially interconnected or interlinked entities. In FIG. 4, the CPU 20 anchors two distinct chains, a first chain 26-1 that includes the APUs 22-1, 22-2, and 22-3 in series, and a second chain 26-2 that includes the APUs 22-4 and 22-5 in series. Another CPU might anchor only a single chain, or more than two chains.

The entities constituting each chain 26 are interconnected via dielectric waveguide (DWG) links 28. For example, for the chain 26-1, the CPU 20 couples to the APU 22-1 via a first DWG link 28-1, the APU 22-1 couples to the APU 22-2 via a second DWG link 28-2, and the APU 22-2 couples to the APU 22-3 via a third DWG link 28-3. For the chain 26-2, the CPU 20 couples to the APU 22-4 via a first DWG link 28-4, and the APU 22-4 couples to the APU 22-5 via a second DWG link 28-5. The length of each link is determined as needed by the deployment scenario, and need not be consistent through the system.

Each chain 26 has a directional sense, with the direction going away from the CPU 20 being referred to as the "downstream" direction, and with the direction going towards the CPU 20 being referred to as the "upstream" direction. Using this nomenclature, the CPU 20 generates "outbound" radio carrier signals and propagates them into the chain 26 in the downstream direction, for over-the-air (OTA) transmission by one or more of the APUs 22 in the chain 26. Conversely, radio carrier signals received via OTA reception by given ones of the APUs 22 are propagated in the chain 26 in the upstream direction, for conveyance to the CPU 20 for processing—e.g., down-conversion and demodulation.

Saying that a radio carrier signal is "propagated" in the chain 26 refers to DWG-conveyance of the radio carrier signal over one or more successive "hops" or "links" in the chain 26. Each DWG link 28 in the chain constitutes one serial hop or link. Radio carrier signals propagated in the chain 26 may also be referred to as "guided" radio carrier signals or "distributed" radio carrier signals to emphasize that they are conveyed via DWGs. With this in mind, one way to understand operation of the chain 26 is that the CPU 20 generates outbound radio carrier signals, which are then propagated downstream in the chain 26, as far as needed, for OTA transmission by one or more of the APUs 22 in the chain 26. In the opposite direction, radio carrier signals received by given APUs 22 via OTA reception are propagated upstream in the chain 26 to the CPU 20.

Consider an example case where the APU 22-1 in the chain 26-1 operates as a serving base station for the UE 12-1 and the CPU 20 generates a radio carrier signal conveying user traffic for the UE 12-1. The CPU 20 has a DWG interface that couples it to one end of the DWG link 28-1 and it uses that interface to propagate the generated radio carrier signal into the DWG link 28-1 as an outbound radio carrier signal targeting the UE 12-1. In turn, the APU 22-1 includes an "upstream" DWG interface that couples it to the other end of the DWG 28-1, and it receives the outbound radio carrier signal via its upstream DWG interface. Because the outbound radio carrier signal targets a UE 12 that is served by the APU 22-1, the APU 22-1 performs an OTA transmission of the radio outbound carrier signal.

Consider a similar example, but where the outbound radio carrier signal targets the UE 12-4, which is served by the APU 22-3. In this case, the APU 22-1 propagates the outbound radio carrier signal to the next hop in the chain 26-1, which is the DWG link 28-2 that couples the APU 22-1 to the APU 22-2. In turn, the APU 22-2 propagates the outbound radio carrier signal to the next hop in the chain 26-1, which is the DWG link 28-3 that couples the APU 22-2 to the APU 22-3.

Now consider the inbound case, where and given APU 22 within a chain 26 receives an OTA transmission from a UE 12 that it serves. That is, the given APU 22 receives an uplink radio carrier signal from the UE 12. The given APU 22 couples the received uplink radio carrier signal into the DWG link 28 on its upstream side—facing the CPU 20—for propagation in the chain 26 in the upstream direction as an inbound radio carrier signal for the CPU 20. Any intervening APUs 22 in the upstream direction between the given APU 22 and the CPU 20 perform respective next-hop propagations of the inbound radio carrier signal towards the CPU 20.

As such, each APU 22 can transmit and receive via its DWG interfaces, for propagation of radio carrier signals within the chain 26—i.e., waveguide conveyance in the downstream or upstream direction of the chain 26. Further, each APU 22 includes or is associated with an antenna array 24, for OTA transmission of radio carrier signals, referred to as downlink (DL) transmission, and OTA reception of radio carrier signals, referred to as uplink (UL) reception.

All APU operations may be managed and controlled by the CPU 20, e.g., by the CPU 20 distributing control signaling in the chain 26 for the included APUs 22. In one or more embodiments, each APU 22 operates in TDD fashion, such that it performs OTA reception mutually exclusive from OTA transmission and, with respect to one DWG to which it is coupled, it performs DWG reception mutually exclusive from DWG transmission.

Figure 1:
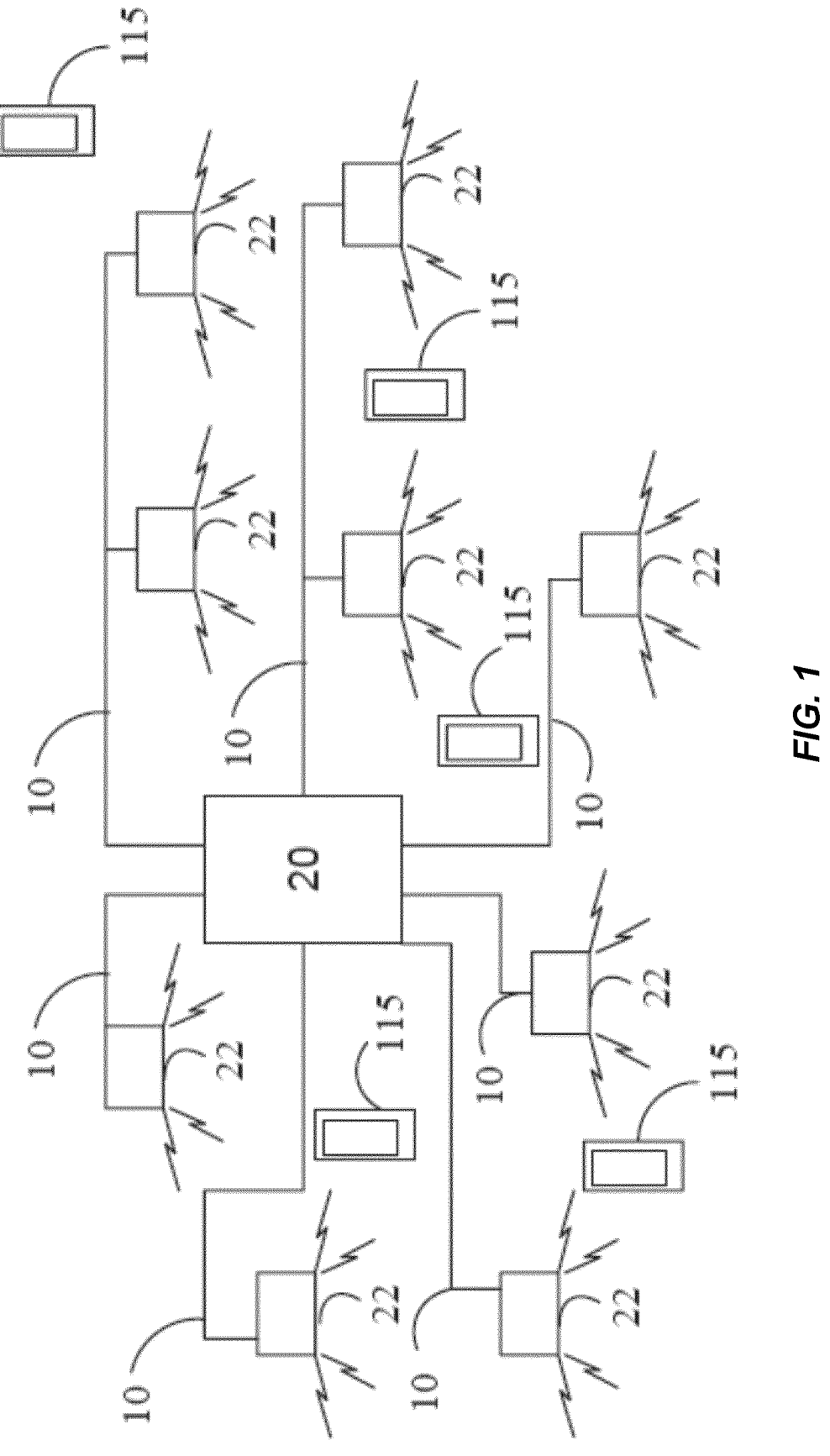
FIG. 1 is an illustration of an example cell-free massive MIMO system.

Each DWG link 28 comprises at least one DWG—that is, the term "DWG link" as used herein refers to at least one dielectric waveguide. In at least one embodiment, each DWG link 28 comprises a parallel pair of DWGs, with each DWG in the parallel pair being dedicated to a different radio-carrier-signal polarization. Relating this example arrangement to FIG. 1, the DWG link 28-1 is an upstream link with respect to the APU 22-1 and it includes a parallel pair of DWGs, and the DWG link 28-2 is a downstream link with respect to the APU 22-1 and it includes a parallel pair of DWGs. Of course, with respect to the APU 22-2, the DWG link 28-2 is an upstream link and the DWG link 28-3 is a downstream link for the APU 22-2.

Using two or more parallel DWGs in each DWG link 28 allows separate radio carrier signals to propagate simultaneously over the DWG link 28, e.g., for different polarizations and/or greater signal capacity in the chain 26. For example, in FIG. 4, consider the case where each DWG link 28 in the chain 26-1 includes a single DWG for each polarization that is in use. That means that one series set of DWGs is available in the entire chain 26-1 for use in transmitting or receiving radio carrier signals of the involved polarization, at least in a TDD implementation.

In at least one arrangement, the DWG links 28 within a chain 26 comprise 2×N parallel DWGs, where the APUs 22 in the chain 26 are interleaved and every N:th APU 22 is connected to the same DWG pair. Also, such arrangements would gain a capacity increase and increased robustness by terminating the chain 26 with a CPU 20 at each end. For example, one of the terminating CPUs 20 could take over for the other one, if needed, using the same set of series-connected DWGs, or the DWG links 28 in the chain 26 could have respective sets of series-connected DWGs for each of the CPUs 20, such that one of the CPUs 20 acts as a master CPU on one of the sets of series-connected DWGs while the other CPU 20 acts as a master CPU on the other one of the sets of series-connected DWGs. Of course, the APUs 22 would be configured to support such operation.

With TDD operation of the CPU 20, APUs 22, and DWG links 28 in one chain 26-1, conveying radio carrier signals in the downlink direction of the chain 26-1 is mutually exclusive from conveying them in the upstream direction. As such, all of the UEs 12 served by the chain 26-1 "share" the radio-carrier-signal bandwidth in time, with only one UE 12 being served at a time. To change this, the chain 26-1 can include more than one DWG in each DWG link 28, for each polarization in use, such that a first series set of DWGs in the chain 26-1 can be used to serve a given UE 12 at a given time instant, while a second series set of DWGs in the chain 26-1 in parallel with the first set can be used to serve another given UE 12 at the same time.

However, whether each of the DWG links 28 that form the series sets of DWGs individually comprise single DWGs or two or more DWGs in parallel, the DWG-based connection arrangement offers distinct advantages. For example, using digital interfaces for the serial interconnections in the chain 26 would raise serious issues with respect to power consumption and complexity of the serial interconnections and the APUs 22, particularly when targeting very high bit rates for the traffic exchanged with the UEs 12 served by the network 10. At a minimum, the use of digital interfaces would require each APU 22 to include corresponding analog-to-digital converters and digital to analog converters.

Further, as noted, the APUs 22 as contemplated herein need not perform any modulation, demodulation, or frequency-shifting, meaning that the radio carrier signals they transmit over the air are the same ones they received from the CPU 20 via downstream propagation in the chain 26, subject, of course, to any transmit beamforming applied by the APU 22. Similarly, and APU 22 may perform reception beamforming but, besides that, the OTA-received radio carrier signal incoming to the APU 22 is the same carrier radio signal that the APU 22 propagates in the upstream direction as an inbound radio signal for the CPU 20.

As a further advantageous simplification used in one or more embodiments of the APUs 22, the DWG interfaces included in the APUs 22 operate in TDD fashion with respect to each DWG included in a corresponding DWG link 28-1. That is, with respect to a single DWG, the DWG interface transmits and receives on a mutually exclusive basis. This arrangement reduces complexity, e.g., the need for diplexers and other frequency-multiplexing circuitry. And, as noted, the APUs 22 need not perform frequency-conversion or shifting for the radio carrier signals they handle.

The distributed radio system illustrated in FIG. 4 comprises several antennas processing units (APU) 22, which are connected to a single central processing unit (CPU) 20, using serial links 28-1, 28-2, 28-3, etc. More particularly, each APU 22 is connected to at least one neighboring APU 22 and/or to CPU 20 via a pair of dielectric waveguides 28 that carries the RF signal. Two dielectric waveguides 28 may be used for each link so that an APU can be provided (or provide) different RF signals for each of two antenna polarizations. Of course, more than two dielectric waveguides may be used to link neighboring units, in some embodiments.

At each end of each dielectric waveguide, the RF signal received from or transmitted into the dielectric waveguide is converted to or from an electrical signal with a dielectric waveguide interface antenna. These antennas, which may in some cases be very simple conductive elements, launch the RF signals into the dielectric waveguides and pickup RF signals from the dielectric waveguides. The length of each dielectric waveguide 28 is set by the deployment scenario and is therefore not a fixed length.

In a system like that illustrated in FIG. 4, communications along the links interconnecting the CPU and the APUs may be described as "upstream" and "downstream" communications, where upstream communications are communications in the direction towards the CPU while downstream communications are in the opposite direction, i.e., away from the CPU. In the upstream direction, each APU thus sends its own received radio signal towards the CPU, when requested, via an upstream dielectric waveguide interface. It may also forward, via the upstream dielectric waveguide interface, radio signals it receives, via a downstream dielectric waveguide interface, from an APU that is further downstream in the chain of APUs. In the other direction, the APU receives from the CPU or an upstream APU, via the upstream dielectric waveguide interface, a radio signal for transmitting to one or more UEs. It may also receive, via the upstream dielectric waveguide interface, radio signals for forwarding, via the downstream dielectric waveguide interface, to one or more APUs further downstream.

Figures 5, 6:
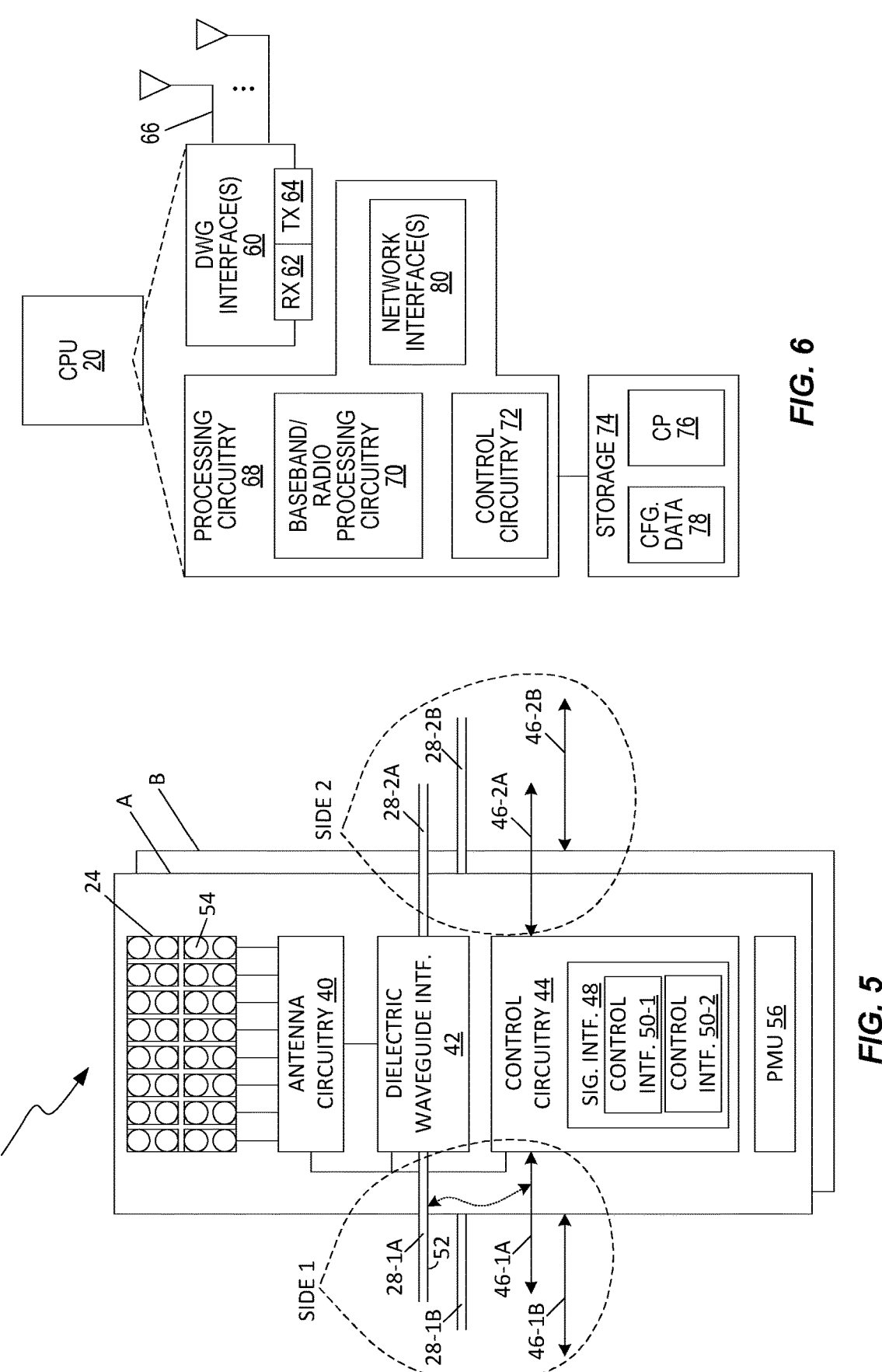
FIG. 5 illustrates an example APU, according to some embodiments.
FIG. 6 illustrates an example CPU, according to some embodiments.

FIG. 5 depicts an APU 22 in an example embodiment. The APU 22 includes two sides in a functional sense, labeled in the diagram as SIDE 1 and SIDE 2. One is the upstream side facing towards the CPU 20 controlling the chain 26 in which the APU 22 operates and the other side is the downstream side facing away from the CPU 20.

The APU 22 includes "A" elements for a first radio-carrier-signal polarization and "B" elements for a second radio-carrier-signal polarization—e.g., horizontal and vertical polarizations. These may be referred to as "Part A" and "Part B" in the discussion that follows. Correspondingly, the antenna array 24 comprises a small antenna matrix for each polarization. Only the A matrix is visible in the diagram. Each antenna matrix provides beamforming gain and thus improve the link budget between the APU 22 and the UEs 12 that it serves, along with improves the interference situation in implementations where multiple chains 26 use the same radio carrier frequencies. Example matrix dimensions are 6 mm×12 mm for 100 GHz radio carrier signals, with the antenna elements 54 spaced at lambda/2 (1.5 mm).

The example APU 22 further includes antenna circuitry 40 that interfaces with the antenna array 24, a dielectric waveguide interface 42, and control circuitry 44 that may exchange control signaling on the upstream side and on the downstream side of the APU 22. For example, the CPU 20 may output control signaling for the APUs 22 in the chain 26 and each APU 22 in the chain may transfer some or all such signaling onto the next APU 22 in the chain. The signaling may be common to the A and B parts of the APU 22 or may be separate for the A and B parts, e.g., coordinated but separate signaling for A and B radio-carrier-signal polarizations handled by the APU 22. FIG. 5 illustrates such a case, where 46-1A denotes upstream-side control signaling associated with the A part of the APU 22, 46-1B denotes upstream-side control signaling associated with the B part of the APU 22, 46-2A denotes downstream-side control signaling associated with the A part of the APU 22, and 46-2B denotes downstream-side control signaling associated with the B part of the APU 22. Of course, this example not limiting and other control signaling arrangements are contemplated.

In similar A/B fashion, the DWG interface 42 of the APU 22 connects to two DWGs in each direction. That is, on SIDE 1 of the APU 22, the DWG interface 42 provides DWG coupling for two DWGs constituting the SIDE-1 DWG link 28-1. These two SIDE-1 DWGs are denoted as 28-1A and 28-1B, corresponding to the A and B parts of the APU 22. Likewise, the DWG interface 42 provides DWG coupling for two DWGs 28 constituting the SIDE-2 DWG link 28-2. These two SIDE-2 DWGs are denoted as 28-2A and 28-2B, corresponding to the A and B parts of the APU 22.

The DWG 28-1A on SIDE 1 "maps" to the DWG 28-2A on SIDE 2, meaning that in relay operation, the APU 22 couples radio carrier signals incoming to the APU 22 from the DWG 28-1A over to the DWG 28-2A, and vice versa. The same cross-side mapping applies for the DWGs 28-1B and 28-2B. In at least one embodiment, the 28-1A/28-2A pairing of DWGs handles a first radio-carrier-signal polarization, such as horizontal polarization, and the 28-1B/20-2B pairing of DWGs handles a second radio-carrier-signal polarization, such as vertical polarization. With TDD operation, only one DWG on either side of the APU 22 is needed per polarization.

Assuming that SIDE 1 is the upstream side of the APU 22, in downlink (DL) operation, also referred to as outbound operation, the DWGs 28-1A and 28-1B carry corresponding outbound radio carrier signals of "A" and "B" polarization, originated from the CPU 20 and propagated in the chain 26 towards the APU 22. If the APU 22 is operating as a relay station, its DWG interface 42 couples these outbound radio signals over to SIDE 2 of the APU 22, into the DWGs 28-2A and 28-2B, for the next APU 22 in the chain 26. Conversely, in base-station or transceiver mode, the DWG interface 42 of the APU 22 couples the outbound radio carrier signals incoming on DWGs 28-1A and 28-1B into the antenna circuitry 40, for OTA transmission from the antenna array 24 (the A and B antenna matrixes in FIG. 3).

Assuming, again, that SIDE 1 is the upstream side of the APU 22, in uplink (UL) operation, also referred to as inbound operation, relay-station operation of the APU 22 involves the APU 22 receiving inbound radio carrier signals on its downstream side (SIDE 2), i.e., on the DWGs 28-2A and 28-2B, where these signals were received via OTA reception by another APU 22 that is downstream in the chain 26. The APU 22 couples these inbound signals into the SIDE-1 DWGs 28-1A and 28-1B, for propagation towards the CPU 20. For base-station mode UL operation, the APU 22 receives an UL radio carrier signal from a UE 12 and couples it into its SIDE 1 DWG interface, for propagation towards the CPU 20 as an inbound radio carrier signal.

Another point worth emphasizing is that the A/B segregations shown in FIG. 5 aid discussion, but they are not meant to suggest limitations on how an APU 22 may be implemented with respect to multiple polarizations. At least some aspects may be integrated.

Other example elements illustrated in the APU 22 of FIG. 5 include a signaling interface 48 of the control circuitry 44, which may include two respective control interfaces 50, with the interface 50-1 for control-signaling connectivity on the upstream side of the APU 22 and the interface 50-2 for control-signaling connectivity on the downstream side of the APU 22. For example, the CPU 20 generates control signaling to control the APUs 22 included in a chain 26, such as TDD-related control signaling that determines the relaystation and base-station operations of individual APUs 22 in the chain 26. Such signaling may flow via serial controlsignaling links between the CPU 20 and the successive APUs 22 in the chain 26, with the APU 22 closest to the CPU 20 receiving control signaling directly from the CPU 20 and passing all or some of it along to the next APU 22, and so on.

To this end, the control circuitry 44 in one or more embodiments comprises one or more microprocessors, Digital Signal Processors (DSPs), Field Programmable Gate Arrays (FPGAs), or Application Specific Integrated Circuits (ASICs), or any mix thereof. The control circuitry 44 may include or be associated with memory or other computerreadable media, and may operate according to the execution of stored computer program instructions.

In at least one embodiment, the DWGs 28 comprising the DWG links 28 have a conductive exterior 52 that provides an electrical connection for exchanging control signaling between the CPU 20 and the adjacent APU 22, and between adjacent APUs 22. The conductive exterior 52 comprises, for example a metallic coating or a conductive sheathing. In other embodiments, dedicated wired connections independent of the DWG links 28 electrically interconnects the CPU 20 and the APUs 22. In either case, the control signaling includes, for example, TDD control signaling and mode control signaling, according to which the CPU 20 determines which APUs 22 transmit or receive OTA radio carrier signals at what times. Thus, the control signaling provides for operation of the APUs 22 as a distributed antenna system, where the CPU 20 schedules the transmission and/or reception of user traffic from respective UEs 12 served by the chain 26, via respective ones of the APUs 22 in the chain 26.

Each APU 22 may also include or be associated with a power management unit (PMU) 56. The PMU 56 provides operating power for the antenna circuitry 40, the DWG interface 42, and the control circuitry 44, for example. In at least some embodiments, the PMU 56 is controllable by the CPU 20 via the control signaling. In addition to the conductive exteriors 52 of the DWGs in the DWG links 28 carrying the control signaling, the conductive exteriors 52 also may be used to supply operating power, e.g. DC voltage down the chain 26 of APUs 22.

In a Power-over-Ethernet (POE) example, a 48 volt direct-current (VDC) power signal is carried via the conductive coatings 52 included in the respective DWG links 28. However, lower operating voltages may be used, e.g., to facilitate full monolithic integration of the circuitry comprising each APU 22. To some extent, the voltage drops incurred on the successive interconnections used to carry the control signaling down the chain 26 of APUs 22 may dictate the voltage level of the DC power signal and the PMU 56 of each APU 22 may include DC/DC converters, as needed, to provide the particular operating voltages needed within the APU 22.

While carrying the control signaling over the power feed may be advantageous in terms of reduced complexity and parts count, the arrangement should be understood as a non-limiting example for the control-signaling interconnections. More broadly, the control signaling arrangement may be implemented as a parallel, low-frequency serial peripheral interface (SPI), with the CPU 20 outputting control signaling for respective ones of the APUs 22 via the SPI.

Each APU 22 has, for example, a unique identifier that allows the CPU 20 to identify which APU 22 is targeted by particular control signaling. Application Specific Integrated Circuits (ASICs) or other integrated circuitry used within each APU 22 may, for example, be fused with a unique identifier that fixes the APU's identity. Dynamic or configurable identities also may be used in one or more embodiments. An APU 22 that receives control signaling not targeted to it would pass it along the next control-signaling hop in the chain 26, in the downstream direction. Likewise, upstream control signaling would pass from APU 22 to APU 22 in the chain 26, as needed, to reach the CPU 20.

As noted, the CPU 20 uses the control signaling to, among other things, control the state of each APU 22 in the chain 26. Here, the possible states may be relay mode, base-station mode, and standby mode, as set under control of the CPU 20.

FIG. 6 illustrates an example arrangement for the CPU 20 in one or more embodiments. The CPU 20 includes DWG interfaces 60, including receiving and transmitting circuitry 62 and 64, for coupling into the DWGs that comprise its DWG link 28 into the first APU 22 of a chain 26 of APUs 22 controlled by the CPU 20. In at least one embodiment, the DWG interface(s) 60 of the CPU 20 use antennas 66 to transmit outbound radio carrier signals into the associated DWG link 28 and to receive inbound radio carrier signals from the associated DWG link 28. The antennas 66 may be placed for lateral feeding into the associated DWG link 28, and the same arrangement may be implemented in each of the APUs 22, for coupling with their respective upstream and downstream DWG links 28.

The CPU 20 also includes processing circuitry 68, including baseband radio processing circuitry 70 for baseband processing of outbound and inbound signals corresponding to the outbound and inbound radio carrier signals. The CPU 20 further includes control circuitry 72 configured for controlling operation of the CPU 20 and for controlling one or more chains 26 of APUs 22 that are coupled to the CPU 20. To that end, the control circuitry 72 is associated with one or more control-signaling interfaces, e.g., SPI circuitry. The control circuitry 72 or the processing circuitry 68 at large also may be associated with one or more network interfaces 80, e.g., that support backhaul connections for carrying user traffic and related network-control signaling between the CPU 20 and one or more supporting nodes in the CN 18.

The processing circuitry 68 in one or more embodiments includes or is associated with storage 74, e.g., for storing configuration data 78 associated with the operation of the CPU 20 and/or one or more computer programs ("CP" in the diagram) 76 comprising computer program instructions, the execution of which by one or more microprocessors or other types of digital processors configure such processors as said processing circuitry 68. That is, the processing circuitry 68 may be fixed circuitry or programmed circuitry and, in at least one embodiment, the processing circuitry 68 is at least partly realized by one or more microprocessors being specially adapted according to their execution of computer program instructions stored in the storage 74. These computer program instructions, whether stored in storage 74 or stored or communicated elsewhere, may be understood as constituting a computer program product. Such computer program products are in themselves embodiments of the presently disclosed invention.

Correspondingly, the storage 74 provides for at least temporary storage of the computer program(s) 76 and also may provide working memory for program execution. Broadly, the storage 74 comprises one or more types of computer-readable media, with non-limiting examples including any one or more of SRAM, DRAM, NVRAM, FLASH, EEPROM, and Solid State Disk (SSD).

The CPU 20 also includes radiofrequency receive (RX) circuitry 62 and transmit (TX) circuitry 64 that is associated with the baseband radio processing circuitry 70 and with the DWG interfaces 60. In cooperation with the baseband radio processing circuitry 70, the CPU 20 uses the TX circuitry 64 to generate outbound radio carrier signals for output via the DWG interface(s) 60. Likewise, the CPU 20 uses the RX circuitry 62 to process inbound radio carrier signals received via the DWG interface(s) 60. In this regard, the CPU 20 can be understood as providing all modulation and frequency up-conversion processing for outbound radio carrier signals conveyed in the chain 26 of APUs 22, and providing all demodulation and frequency down-conversion processing for inbound radio carrier signals conveyed in the chain 26 of APUs 22.

Figure 7:
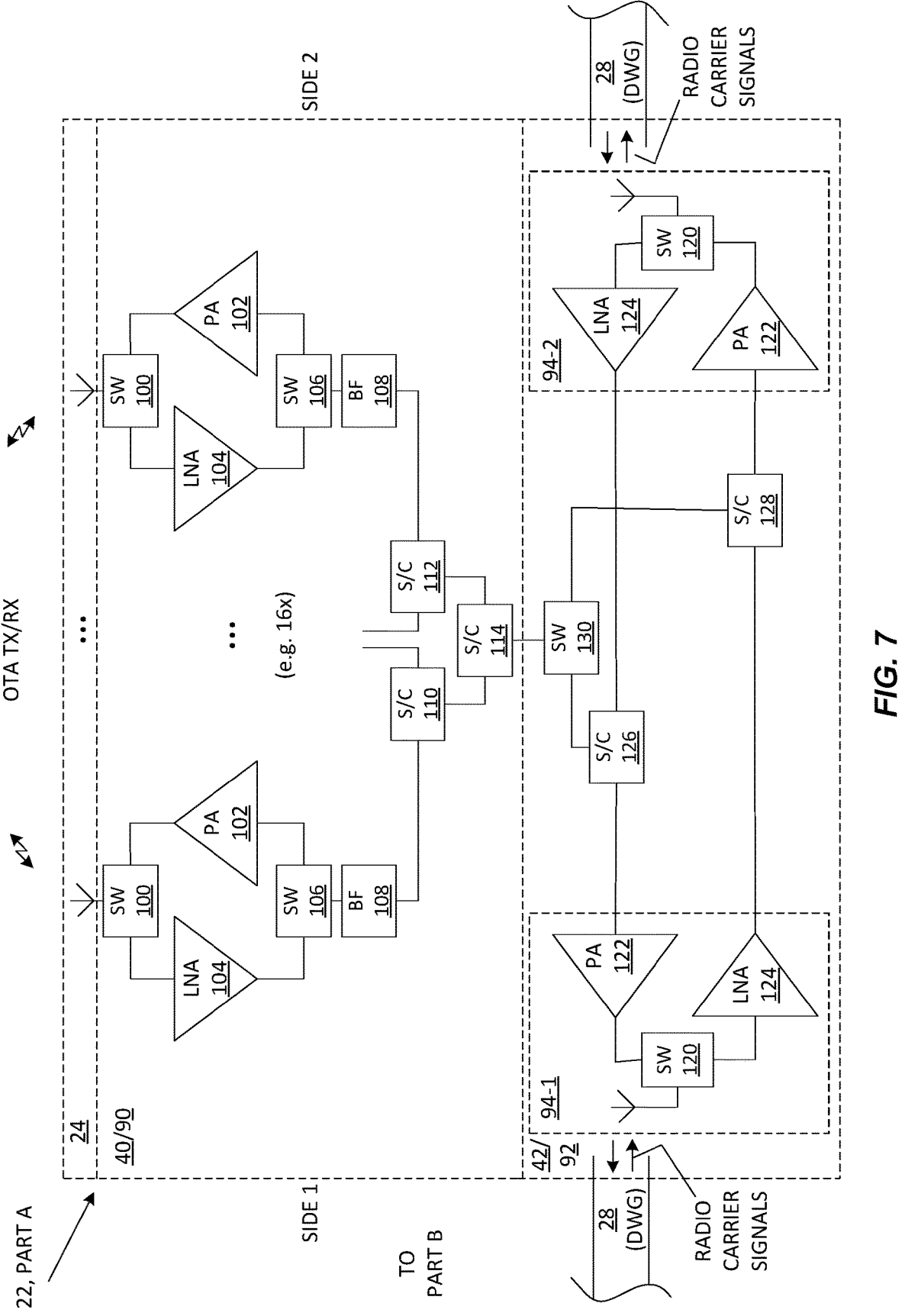
FIG. 7 illustrates further details of an example APU, according to some embodiments.

FIG. 7 is a block diagram illustrating more details of part A of APU 22. Again, it should be understood that example APU 22 may comprise a substantially identical part B, which supports a different antenna polarization. FIG. 7 focuses on an example implementation of the DWG interface 42 and the antenna circuitry 40. The antenna circuitry 40 includes first radiofrequency circuitry 90 and the DWG interface 42 includes second radiofrequency circuitry 92.

In an example case, the antenna array 24 includes sixteen antenna elements for transmission and/or reception beamforming, and the first radiofrequency circuitry 90 includes a corresponding block of radiofrequency circuitry per antenna element of the antenna array 24. Each block includes a switch 100, a power amplifier (PA) 102, a low noise amplifier (LNA) 104, a switch 106, a beamforming circuit element 108, and a splitter/combiner (S/C) 110.

The second radiofrequency circuitry 94 comprises respective DWG coupling circuits 94-1 and 94-2. Each DWG coupling circuit 98 provides for transmit/receive coupling via an associated antenna 98 into a DWG 28. To the extent that the APU 22 supports more than one DWG 28 per DWG link 28, it will have a DWG coupling circuit 94 per DWG 28. Going back momentarily to FIG. 5, the depicted APU 22 would include two DWG coupling circuits 94 on SIDE 1, one for the SIDE-1 A connection and one for the SIDE-1 B connection, and two DWG coupling circuits 94 on SIDE 2, one for the SIDE-2 A connection and one for the SIDE-2 B connection.

Further, as seen in FIG. 7, each DWG coupling circuit 94 on one side of the APU 22 is paired with—coupled to—a corresponding DWG coupling circuit 94 on the other side of the APU 22. That is, each DWG coupling circuit 94 on the upstream side of the APU 22 has a corresponding DWG coupling circuit 94 on the downstream side of the APU 22. These complementary pairings, the upstream/downstream pairings, provide for the coupling of radio carrier signals from an upstream DWG 28 into a corresponding downstream DWG 28—i.e., next-hop conveyance. In the diagram, transfer circuitry 99 provides such coupling between the DWG coupling circuit 94-1 and the DWG coupling circuit 94-2.

For relay operation of an outbound radio signal and assuming that SIDE 1 is the upstream side of the APU 22 and that SIDE 2 is the downstream side, an outbound radio carrier signal appears on the DWG 28-1 and the switch 120 of the DWG coupling circuit 94-1 (upstream coupler) is set for receiving, such that the outbound radio carrier signal radiates from the upstream DWG 28-1 and is coupled to the input of the LNA 124 of the upstream coupler. The LNA 124 of the upstream coupler outputs the outbound radio carrier signal with amplification and applies it to an S/C 128 of the transfer circuitry. In turn, the S/C 128 applies the outbound radio carrier signal to the input of a PA 122 of the DWG coupling circuit 94-2 (downstream coupler). The PA 122 outputs the outbound radio carrier signal with power amplification, and a switch 120 of the downstream coupler is set for transmission, meaning that the outbound radio carrier signal is launched via the antenna 98 of the downstream coupler into the downstream DWG 28-2.

For relay operation of an inbound radio signal and assuming that SIDE 1 is the upstream side of the APU 22 and that SIDE 2 is the downstream side, an inbound radio carrier signal appears on the DWG 28-2 and the switch 120 of the downstream coupler is set for receiving, such that the inbound radio carrier signal radiates from the downstream DWG 28-2 and is coupled to the input of the LNA 124 of the downstream coupler. The LNA 124 of the downstream coupler outputs the inbound radio carrier signal with amplification and applies it to an S/C 128. In turn, the S/C 128 applies the outbound radio carrier signal to the input of a PA 122 of the upstream coupler. The PA 122 of the upstream coupler outputs the inbound radio carrier signal with power amplification, and the switch 120 of the upstream coupler is set for transmission, meaning that the inbound radio carrier signal is launched via the antenna 98 of the upstream coupler into the upstream DWG 28-1.

For base-station operation with respect to an outbound radio carrier signal received at the APU 22 via the upstream coupler, the S/C 128 applies outbound radio carrier signal to a SW 130 that couples it into an S/C 112 of the antenna circuitry 40. The S/C 112 and S/Cs 110 split/distribute the outbound radio signal into the respective per-antenna blocks. In embodiments where the APU 22 performs transmit beamforming, the split radio carrier signal into each of the antenna blocks is weighted by the beamforming element 108 and the switches 106 and 100 are set for transmission, meaning that the split and weighted radio carrier signal passes to the input of the PA 102, for power amplification and OTA transmission from the associated antenna element.

For base-station operation with respect to an OTA radio carrier signal received at the APU 22 via its antenna array 24, the switches 100 and 106 of each antenna block are set for receive, meaning that an antenna-received radio carrier signal appears at the input of the LNA 104 in each block, which provides low-noise amplification for the antenna-received radio carrier signal and applies it to the beamforming element 108. In embodiments of the APU 22 that perform receive beamforming, the beamforming element 108 applies a weighting to the radio carrier signal output from the LNA 104 and provides it to a respective one of the S/Cs 110, which combine the radio carrier signals incoming from each of the antenna blocks. Correspondingly, the S/C 112 forms a combined radio carrier signal, e.g., a combination of the weighted radio carrier signals output from the respective beamforming elements 108 of the antenna blocks and couples the combined radio carrier signal into the switch 130, which is set for inbound base-station operation and, therefore, couples it into the S/C 126.

In turn, the S/C 126 couples the combined radio carrier signal to the PA 122 of the upstream coupler, which provides power amplification for it and applies it to the switch 120 of the upstream coupler. The switch 120 is configured for transmission, meaning that the combined radio carrier signal from the PA 122 of the upstream coupler is launched into the upstream DWG 28-1, as an inbound radio carrier signal, for propagation in the chain 26 towards the CPU 20.

It will be understood that the selective operation of the SWs 100, 106, 120, and 130, as well as other modally-controlled elements of the first and second radiofrequency circuitry 90 and 92 of the APU 22 are controlled within the APU 22 by the control circuitry 44 of the APU 22, in dependence on the operational state of the APU 22. In turn, the control circuitry 44 of the APU 22 controls the operational state of the APU 22 in dependence on the control signaling targeted to it by the CPU 20. In this respect, the various SWs and S/Cs within the radio frequency circuitry 90 and 92 can be considered as part of the control circuitry 44.

Similarly, the beamforming solutions used by the APU 22 for transmit and/or receive antenna beamforming—i.e., the dynamically configured sets of antenna weights collectively applied by the beamforming elements 108 of the antenna blocks—may be determined by the CPU 20 and conveyed to the APU 22 via the control signaling. As such, the control circuitry 44 of the APU 22 includes or interfaces to the beamforming elements 108, to set the per-antenna weights applied to the radio carrier signals incoming from the antenna array 24 or outgoing to the antenna array 24.

As seen in FIG. 7, the same or similar RF-circuit building blocks are used to implement the antenna circuitry 40 and the DWG interface 42. Notably, the elimination of frequency-conversion blocks and mixed-mode circuits from the radio-carrier-signal paths within the APU 22 relaxes the requirements on the integrated-circuit process choices available for implementation of these parts of the APU 22. As a further advantage, the absence of filters from the radio-carrier-signal paths within the APUS 22 enables full monolithic integration of the circuit elements comprising the antenna circuitry 40 and the DWG interface 42.

In a dielectric-waveguide-based distributed wireless system as described above, in sending the modulated RF signal across the waveguide, the CPU is generally limited to sending only one signal at a time in each waveguide. This problem could partly be mitigated by using parallel waveguides, but this makes the system more bulky and costly. In normal operation, then, the distributed wireless system is operated in such a way that only one APU is active at a time, preferably the one having the lowest pathloss to the UE(s) involved in the communication.

In a 5G network, when a UE wants to attach to the network, it starts by looking for a synchronization signal block (SSB). The SSB blocks indicates cell timing and when the UE can do a random-access attempt. In a 5G system employing NR FR2 (frequency range 2), the UE has beamforming and multiple antenna panels to choose between. The UE uses the SSB to find its optimum antenna panel and the beamforming related to that panel. If an SSB originates from multiple APUs, signals from multiple APUs and reflections reach the UE, which might choose a non-optimal panel and beamforming direction. The UE will then use this direction for random access.

Likewise, the distributed base station consisting of several APUs as described above will look for the random access message transmitted by the UE and select the APU(s) with best signal strength. If the UE has selected a non-optimum panel/beam direction, this will cause the system to use a non-optimum APU for communication, resulting in both degraded UE link performance and overall worse system performance.

In many cases the APU also have beamforming, to improve the link budget. Thus, there is a need to identify the APU and, if applicable, the beam of this APU having the lowest path loss to a UE who want to access the network. Similarly, the UE should select its best panel and beam. The use of the same SSB for multiple APUs, however, may make it difficult to find the best APUs and beams for communication.

A feature in NR is to use beams to divide the cell and thus improve coverage and throughput. For initial access, the beams are identified by using unique SSB index. According to several of the techniques described herein, physically separated APUs are grouped, and the NR beam feature is reused by providing unique SSBs to each group. By grouping the APUs in a manner such that the members of a given group are separated from one another by relatively large distances, compared to the typical link distance, the UE can more readily find the APU which provides the UE with the lowest path loss and direct its random access attempt towards that APU.

To further improve the link budget, beamforming can be applied in each APU. Initial access can then be made using wide beams, with a beam refinement procedure subsequently applied, where closed-loop feedback from the UE is used to find the best beam. In some embodiments of the techniques and systems described herein, the SSB index may be used to also identify the optimal beam during initial access. Note that utilizing this approach may implicate a tradeoff between system capacity, which is increased by the use of narrower and/or more optimally directed beams, and access delay.

Another feature in NR is carrier aggregation. Wide carriers can be built by aggregating multiple narrower carriers. One of them is the primary component carrier and the rest are secondary component carriers. By designating a different carrier among a given group of carriers as the primary component carrier in each of several different APU stripes, another degree of freedom to identify each APU becomes available.

The techniques and systems described herein are discussed in terms of NR and FR2. It is foreseen, however, that similar systems may be implemented also at higher frequencies, where the same techniques may be used.

Figure 8:
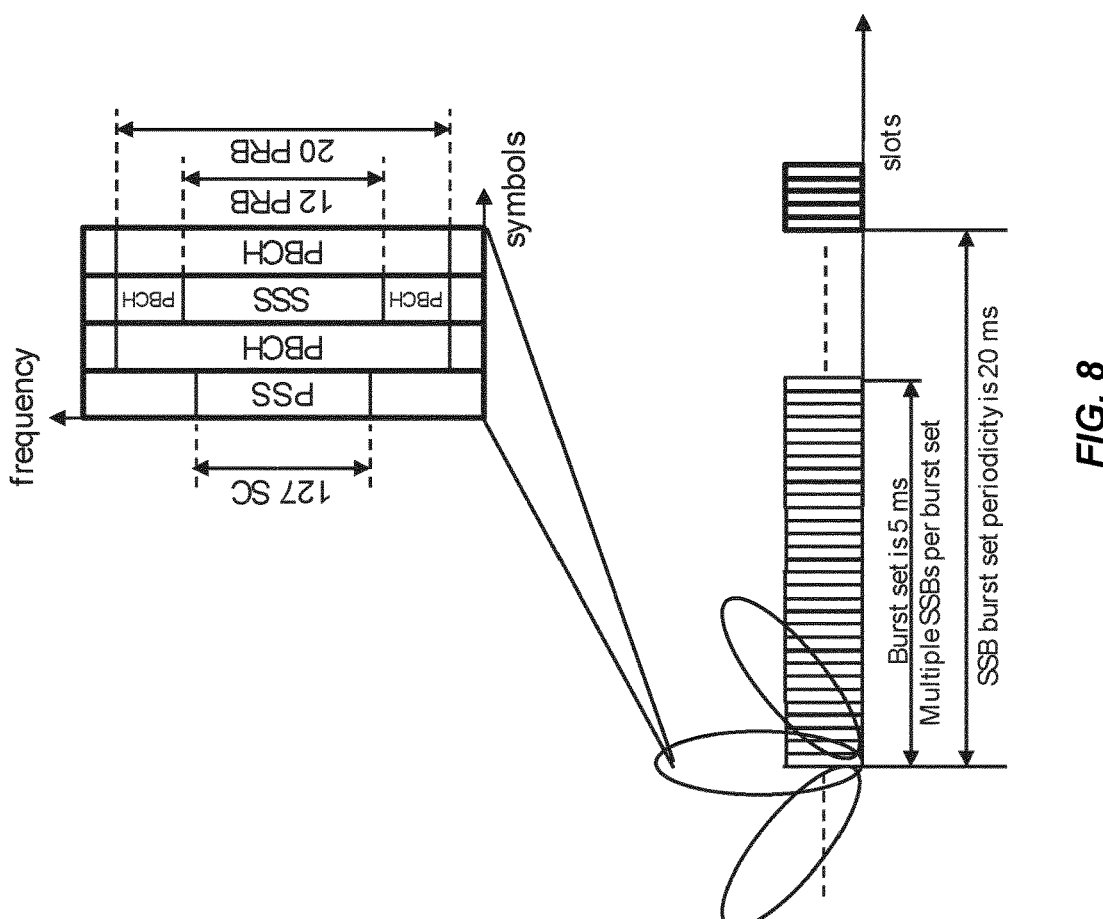
FIG. 8 illustrates an example synchronization signal block (SSB) burst set.

FIG. 8 illustrates the concept of a SSB burst set, which is used in NR to facilitate beam sweeping so that beamforming gain can be achieved during the initial UE access. In normal NR operation, the SSB is sent in different directions during the first 5 milliseconds of the burst set. Then a UE who wishes to access the network makes a random-access attempt at a time indicated in each SSB. Thus, the time of the UE random access attempt indicates which direction is most favorable for the UE.

Figure 9:
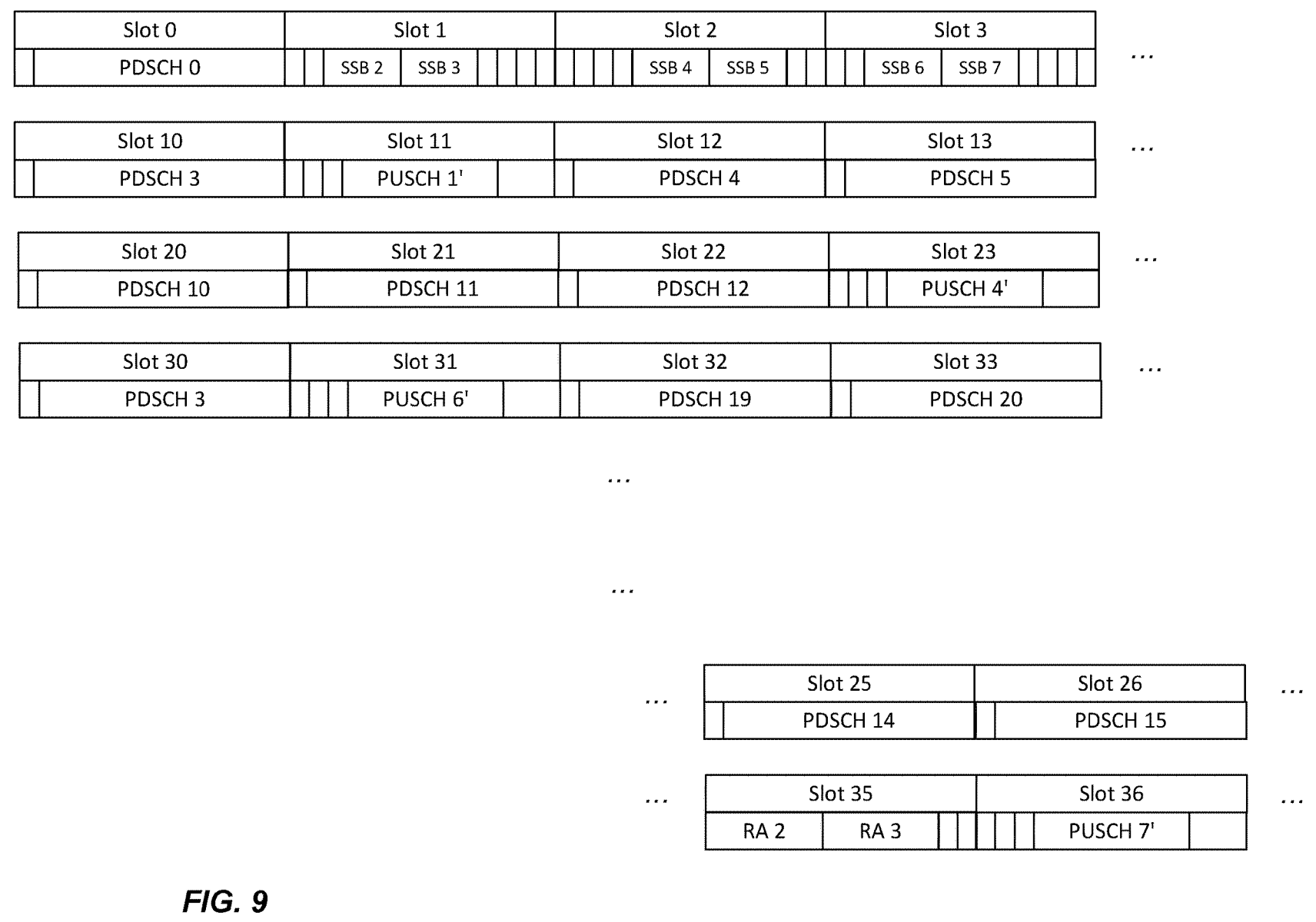

FIG. 9 shows portions of an example signaling during one SSB period of 20 ms. Here, twelve SSBs, numbered SSB3-SSB7 and SSB10-SSB15 are used in the SSB burst set, and are transmitted in slots 1-3 and slots 5-7. In the figure, the SSBs transmitted in slots 1-3 are shown. The corresponding slots for random access attempts are slots 35, 39, 75, 79, 115, and 119—in FIG. 9, slot 35, which is used for random access attempts corresponding to SSB2 and SSB, is shown. The remaining slots in the 160-slot structure may be allocated to control channel signaling, uplink and downlink shared channels, and reference signals.

In normal NR operation, beamforming is used by the base station both when sending SSBs and listening for a random access (RA). As can be seen in FIG. 9, there is some system capacity loss due to the SSB and random access operations; in the illustrated example, twelve slots are dedicated to SSB transmissions and for corresponding random access attempts. Thus, generally it is desirable to minimize the number of unique SSBs.

According to several of the techniques described herein, the NR SSB burst set concept is reused, but adapted for use in grouping the APUs, such that the APUs in a given group use the same SSB, but a different SSB is used for each group. If the groups are formed so that the APUs within a given group (and thus using the same SSB) are physically separated, e.g., by as much as possible given the overall system layout, this provides a way of identifying the APU having the lowest path loss to a UE.

For example, in a system like the one illustrated in FIG. 2, the APU closest to the CPU on the left-hand stripe might be grouped with the most remote APU on the right-hand stripe, with the next closest APU on the left-handed stripe grouped with the second most remote APU on the right-hand stripe, and so on. Since the SSBs are sent consecutively and the random access attempts are made consecutively, this allocation of SSBs can be done in such a way that there is only one active APU on a stripe, for a given SSB transmission.

Figure 10:
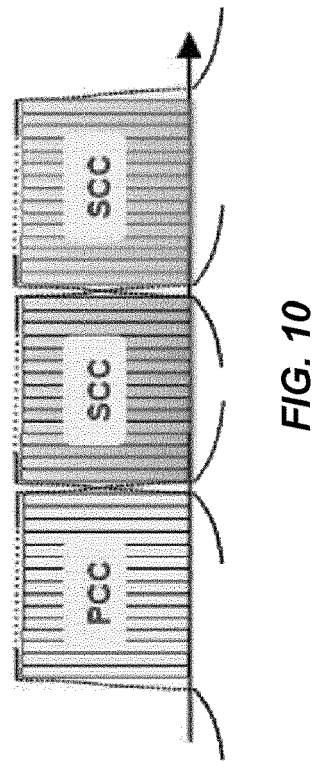
FIG. 10 illustrates principles of carrier aggregation (CA).

Another way to assist in identifying the best APU or APUs to use in serving a given UE is to reuse the NR CA concept. FIG. 10 shows the CA concept in frequency domain. In carrier aggregation, a wide carrier is built out of multiple narrower component carriers (CCs). One is the primary component carrier (PCC) and is used for initial access and signaling. Secondary component carriers (SCCs) are then added when the capacity of the PCC is insufficient. The idea here is to split the available bandwidth used in a distributed wireless system like those described above into multiple CCs. Then each of the APUs within a given group (which may be using the same SSB), can use a different CC as the PCC. In this way we have yet another degree of freedom in distinguishing between and identifying APUs. In addition, the control signaling is spread more evenly across the frequency domain, enabling more system capacity.

Figure 3:
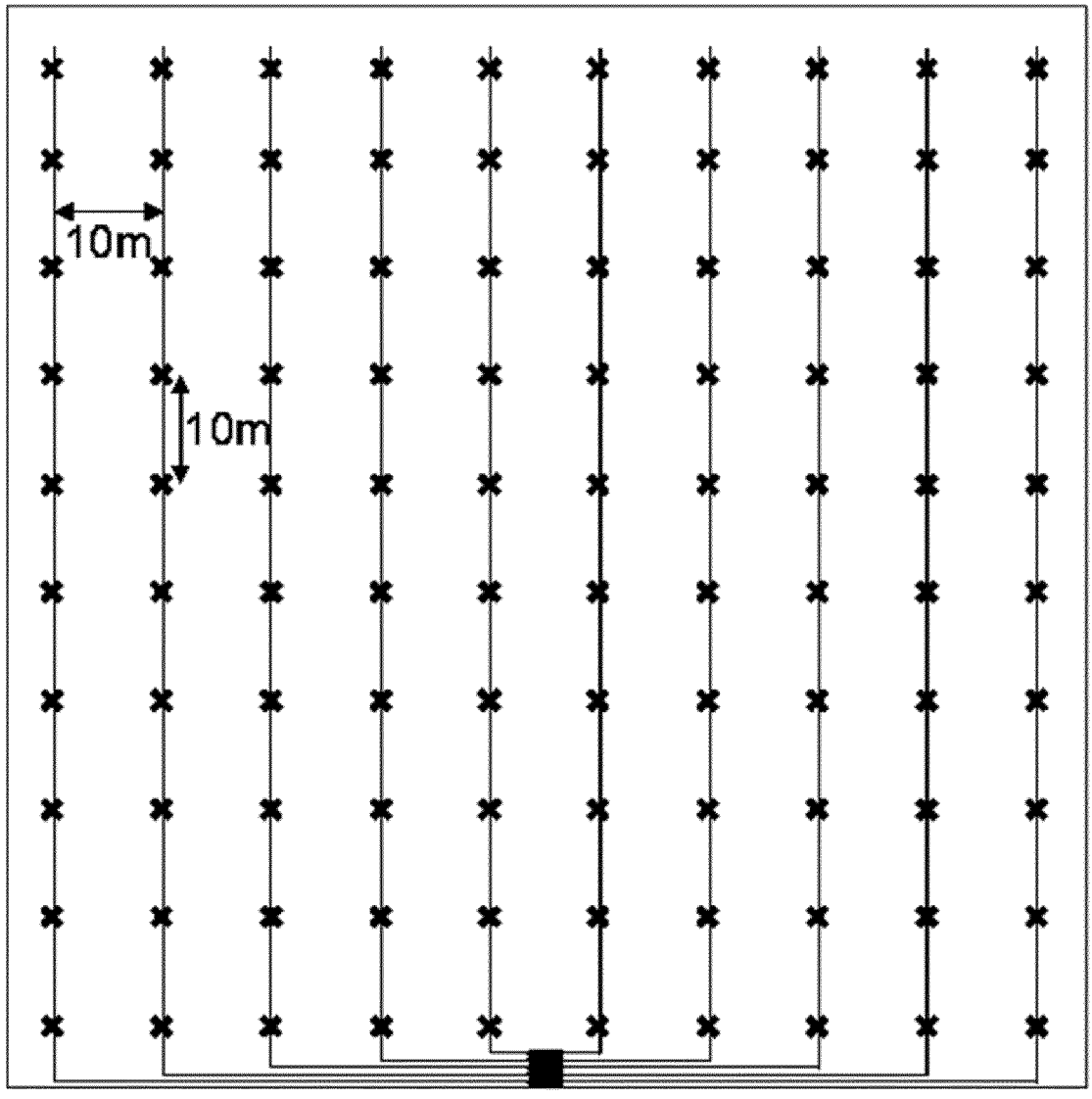
FIG. 3 illustrates another example deployment of a distributed wireless system.

FIG. 3 may be used to illustrate an example where both SSBs and primary component carriers are used to distinguish between APUs. The example deployment illustrated there has APUs deployed on a grid, with a distance of 10 meters between each APU, in both directions of the two-dimensional grid. As an example, each APU on a given stripe may be assigned to a different SSB group, corresponding to different SSB identifiers. Thus, for example, the furthest APU from the CPU on each stripe might be assigned to use a first SSB, the next furthest APU assigned to use a second SSB, and so on. As another example, the ordering might be reversed when moving from one stripe to the next, to increase the minimum distance between two APUs having the same SSB. In addition, multiple component carriers might be used, with a different PCC used among neighboring stripes. Thus, for example, the operating bandwidth might be divided into five component carrier bands, with the left-most stripe being assigned the lowest-frequency component carrier as the PCC, the next stripe using the next lowest-frequency component carrier as the PCC, and so on, with this pattern being repeated until all stripes are assigned a PCC.

If every APU on a given stripe is assigned to a different SSB groups, there will be 10 SSB groups, with 10 members in each group. Each group will have two members assigned to each of the five component carriers, for use as a PCC. Thus, there 50 combinations of SSB and PCC, with only two members assigned to each combination. In the illustrated example, these assignments can easily be made in such a way that the members in each of these pairs are separated from one another by at least 50 meters. Thus, a UE listening for each of the SSBs on each of the component carriers is likely to observe a considerably stronger strength from one of the APUs in a given pair than from the other. Likewise, one APU in any given pair is likely to observe a much greater signal strength than the other when receiving a random access attempt in a corresponding random access opportunity. The chance of misidentifying the best APU or APUs for maintaining a link with the UE is greatly reduced.

Still another technique that may be used in some embodiments of the presently disclosed techniques and systems is to use the relationship between NR SSB and channel state information reference signal (CSI-RS) set to identify a suitable APU/beam pair for every UE. According to this approach, the UE first selects the beamforming direction according to its reception of an SSB, and then triggers the random access procedure. If this random access is successful, the BS will select one beam from one of the APUs to serve this UE. This beam might not be the optimum beam. But, after having the selected beam from the selected APU after the random access procedure, the UE can continuously do measurements, at the direction of the base station. Since there will be several active APUs in one cell, the SSB and non-zero-power (NZP) CSI-RS mapping could let the base station identify the APU and the best beam of that APU, according to UE measurement report. According to 3GPP TS 38.331, V15.7.0, there are a maximum 192 NZP CSI-RS resources, and maximum 64 NZP CSI-RS resources per cell. There are a maximum 112 CSI-RS configurations. In addition, there are a maximum of 16 NZP CSI-RS resource sets and a maximum of 128 NZP CSI-RS resources per CSI-RS resource configuration. For each CSI-RS resource set, there are a maximum of 64 NZP CSI-RS resources, a maximum of 64 NZP CSI-RS resources per resource set and a maximum of 64 NZP CSI-RS resources per cell. Finally, there are a maximum of 64 CSI SSB resource sets per resource configuration. The information element associatedSSB in Radio Resource Control (RRC) signaling can be used for SSB and CSI mapping.

FIG. 11 is a process flow diagram illustrating an example method according to several of the techniques described above. The illustrated method is performed by a controlling node of a distributed wireless system that comprises the controlling node and two or more antenna processing nodes communicatively coupled to the controlling node but spatially separated from each other and from the controlling node. The method comprises, as shown at block 1110, the step of controlling a first subset of the antenna processing nodes to transmit synchronization signal blocks (SSBs) having a first SSB identifier, the first subset including one or more of the antenna processing nodes. As shown at block 1120, the controlling node controls a second subset of the antenna processing nodes to transmit SSBs having a second SSB identifier, the second subset including one or more of the antenna processing nodes and being disjoint with the first subset. It will be appreciated that this technique can be extended to accommodate a third, fourth, and additional subsets of antenna processing nodes and corresponding SSB identifiers, in various deployments. Thus, a method like the one shown in FIG. 11 may further comprise controlling one or more additional disjoint subsets of the antenna processing nodes to transmit SSBs having respective additional SSB identifiers.

Each subset (referred to as a "group" in the description of several detailed examples above) may include one, two, several, or many antenna processing nodes. As was also discussed above, the allocation of antenna processing nodes into these subsets, or groups, may be done in such a way to maximize, to the greatest extent possible or practical, the minimum distance between any two members of the same subset.

In some embodiments, the distributed wireless system is a dielectric-waveguide-based system as was described in detail above. In these embodiments, controlling the antenna processing nodes to transmit the SSBs as shown in blocks 1110 and 1120 may comprise including the SSBs in radio signals sent to the respective antenna processing nodes via one or more dielectric waveguides, for transmission by the respective antenna processing nodes. The respective antenna processing nodes may be instructed when to transmit using control signaling sent separately to the APUs, e.g., via the control signaling mechanisms and techniques described above in connection with FIGS. 5 and 6. In these embodiments where the SSBs are included in radio signals sent to the antenna processing nodes via the waveguides, the SSBs having the first SSB identifier are and the SSBs having the second identifier are time-multiplexed in the radio signals within an SSB burst period, e.g., as in the example shown in FIG. 9.

The method illustrated in FIG. 11 is not necessarily limited to systems utilizing dielectric waveguides. Systems using digital serial links to interconnect the controlling node and the antenna processing nodes might also benefit from some or all of the techniques described herein. In a system employing digital serial links instead of dielectric waveguides, controlling the various antenna processing to send the appropriate SSB identifiers (in the corresponding appropriate time slots) may comprise including the SSB identifiers in digital baseband information sent to the antenna processing nodes, in some embodiments. In others, controlling the antenna processing nodes to send the appropriate SSB identifiers might instead include configuring the antenna processing nodes with SSB identifier information, via a control channel sent over the digital serial links, with the antenna processing nodes inserting their respective SSB identifiers into appropriate parts of the signal waveforms generated and transmitted by the antenna processing nodes.

In some embodiments of the method illustrated generally in FIG. 11, the first subset and the second subset each include two or more antenna processing nodes, and the technique described above for distinguishing between antenna processing nodes by the primary component carrier (PCC) they use is employed. In some of these embodiments, then, controlling the first subset of the antenna processing nodes to transmit SSBs having the first SSB identifier comprises controlling each member of the first subset to transmit the SSBs having the first SSB identifier on a different component carrier than all other members of the first subset, and controlling the second subset of the antenna processing nodes to transmit SSBs having the second SSB identifier comprises controlling each member of the second subset to transmit the SSBs having the second SSB identifier on a different component carrier than all other members of the second subset. This component carrier on which a given SSB is transmitted may be considered the PCC for that antenna processing. More generally, the antenna processing nodes can be controlled in such a way that the members of a given subset (transmitting SSBs with the same identifier) are assigned to use different component carriers for the PCC to the extent possible. Thus, for example, a subset having ten antenna processing nodes may be controlled in such a way that two members of the subset are assigned to each of five component carriers, for use as the PCC.

The method shown in FIG. 11 is for facilitating the selection by the system of the best antenna processing node (or nodes) to serve a given wireless device, or UE. In some embodiments or instances, then, the method further comprises, as shown at block 1130, the step of receiving, via one or more of the antenna processing nodes, a random access request from a wireless device. The method still further comprises, in these embodiments or instances, the step of selecting an antenna processing node for one or more subsequent transmissions by mapping a timeslot in which the random access request was transmitted to an SSB identifier, identifying at least one antenna processing node transmitting SSBs with that SSB identifier, and selecting the antenna processing node for subsequent transmissions from among the identified at least one antenna processing node. This is shown at block 1140. In some instances, more than one antenna processing node transmitting SSBs with that SSB identifier may be identifier, in which case selecting the antenna processing node for one or more subsequent transmissions may comprise selecting the "best" antenna processing node, e.g., selecting the one that observed the highest signal strength for the random access request.

In some of these embodiments, the method further comprises identifying which component carrier was used by the wireless device to transmit the random access request, as shown at block 1035. In these embodiments, selecting the antenna processing node for one or more subsequent transmissions from among the identified at least one antenna processing nodes comprises selecting an antenna processing node that transmitted SSBs on the identified component carrier. In many instances, this may narrow the antenna processing nodes down to a single identified antenna processing, or to just a few, among which the one observing the best signal strength for the random access request might be selected.

In some embodiments, the method may further comprise, after the random access is completed, subsequently receiving from the wireless device, via one or more of the antenna processing nodes, measurement reports corresponding to multiple channel-state-information (CSI) reference signal configurations, where each of the multiple CSI reference signal configurations corresponds to a unique combination of SSB and antenna processing node beam shaping. This is shown at block 1150. In these embodiments, the method may further comprise selecting a combination of antenna processing node and antenna processing node beam shaping, based on the received measurement reports.

The invention claimed is:

1. A method, in a controlling node of a distributed wireless system that comprises the controlling node and two or more antenna processing nodes communicatively coupled to the controlling node but spatially separated from each other and from the controlling node, the method comprising:

controlling a first subset of the antenna processing nodes to transmit synchronization signal blocks (SSBs) having a first SSB identifier, the first subset including one or more of the antenna processing nodes;

controlling a second subset of the antenna processing nodes to transmit SSBs having a second SSB identifier, the second subset including one or more of the antenna processing nodes and being disjoint with the first subset, wherein controlling the antenna processing nodes to transmit the SSBs comprises including the SSBs in radio signals sent to the respective antenna processing nodes via one or more dielectric waveguides, for transmission by the respective antenna processing nodes, wherein the SSBs having the first SSB identifier and the SSBs having the second identifier are time-multiplexed in the radio signals within an SSB burst period.

2. The method of claim 1, wherein the method further comprises controlling one or more additional disjoint subsets of the antenna processing nodes to transmit SSBs having respective additional SSB identifiers.

3. The method of claim 1, wherein the first subset and the second subset each include two or more antenna processing nodes, and wherein:

controlling the first subset of the antenna processing nodes to transmit SSBs having the first SSB identifier comprises controlling each member of the first subset to transmit the SSBs having the first SSB identifier on a different component carrier than all other members of the first subset; and controlling the second subset of the antenna processing nodes to transmit SSBs having the second SSB identifier comprises controlling each member of the second subset to transmit the SSBs having the second SSB identifier on a different component carrier than all other members of the second subset.

4. The method of claim 1, wherein the method further comprises:

receiving, via one or more of the antenna processing nodes, a random access request from a wireless device; and selecting an antenna processing node for one or more subsequent transmissions by mapping a timeslot in which the random access request was transmitted to an SSB identifier, identifying at least one antenna processing node transmitting SSBs with that SSB identifier, and selecting the antenna processing node for subsequent transmissions from among the identified at least one antenna processing node.

5. The method of claim 4, wherein the method further comprises identifying which component carrier was used by the wireless device to transmit the random access request and selecting the antenna processing node for one or more subsequent transmissions from among the identified at least one antenna processing nodes by selecting an antenna processing node that transmitted SSBs on the identified component carrier.

6. The method of claim 4, further comprising:

subsequently receiving from the wireless device, via one or more of the antenna processing nodes, measurement reports corresponding to multiple channel-state-information (CSI) reference signal configurations, each of the multiple CSI reference signal configurations corresponding to a unique combination of SSB and antenna processing node beam shaping; and selecting a combination of antenna processing node and antenna processing node beam shaping, based on the received measurement reports.

7. A controlling node for use in a distributed wireless system that comprises the controlling node and two or more antenna processing nodes communicatively coupled to the controlling node but spatially separated from each other and from the controlling node, wherein the controlling node is adapted to carry out a method according to claim 1.

8. A non-transitory computer-readable medium comprising program instructions for executing by processing circuitry in a controlling node for use in a distributed wireless system that comprises the controlling node and two or more antenna processing nodes communicatively coupled to the controlling node but spatially separated from each other and from the controlling node, the program instructions comprising instructions adapted to cause the controlling node to carry out a method according to claim 1.

9. A method, in a distributed wireless system that comprises a controlling node and two or more antenna processing nodes communicatively coupled to the controlling node but spatially separated from each other and from the controlling node, the method comprising:

the controlling node controlling a first subset of the antenna processing nodes to transmit synchronization signal blocks (SSBs) having a first SSB identifier, the first subset including one or more of the antenna processing nodes;

the controlling node controlling a second subset of the antenna processing nodes to transmit SSBs having a second SSB identifier, the second subset including one or more of the antenna processing nodes and being disjoint with the first subset; and the first and second subsets of antenna processing nodes transmitting the SSBs having the first SSB identifier and the SSBs having the second SSB identifier, respectively, wherein controlling the first and the second subsets of the antenna processing nodes to transmit the SSBs comprises including the SSBs in radio signals sent to the respective antenna processing nodes via one or more dielectric waveguides, for transmission by the respective antenna processing nodes, wherein the SSBs having the first SSB identifier and the SSBs having the second identifier are time-multiplexed in the radio signals within an SSB burst period.

10. A controlling node for use in a distributed wireless system that comprises the controlling node and two or more antenna processing nodes communicatively coupled to the controlling node but spatially separated from each other and from the controlling node, the controlling node comprising:

interface circuitry configured to send information to and receive information from a plurality of antenna processing nodes;

processing circuitry operatively coupled to and configured to control the interface circuitry and configured to:

control a first subset of the antenna processing nodes to transmit synchronization signal blocks (SSBs) having a first SSB identifier, the first subset including one or more of the antenna processing nodes;

control a second subset of the antenna processing nodes to transmit SSBs having a second SSB identifier, the second subset including one or more of the antenna processing nodes and being disjoint with the first subset, wherein the interface circuitry comprises a dielectric waveguide interface configured to transmit and receive radiofrequency (RF) signals via a respective dielectric waveguide, to and from a first antenna processing node in a series of antenna processing nodes connected to one another via dielectric waveguides, and wherein the controlling node further comprises:

receive circuitry;

transmit circuitry operatively coupled to a first dielectric waveguide interface and configured to transmit RF waveguide interface and configured to transmit RF signals via the first dielectric waveguide interface and receive RF signals via the first dielectric waveguide interface;

baseband and radio processing circuitry configured to generate RF signals from baseband signals; and wherein the processing circuitry is operatively coupled to and configured to control the receive circuitry, the transmit circuitry, and the baseband and radio processing circuitry to control the first and the second subsets of the antenna processing nodes to transmit the SSBs having the first and the second SSB identifiers by controlling the receive circuitry, the transmit circuitry, and the baseband and radio processing circuitry to include the SSBs in radio signals sent to the respective antenna processing nodes via the dielectric waveguide interface for transmission by the respective antenna processing nodes, and wherein the SSBs having the first SSB identifier and the SSBs having the second identifier are time-multiplexed in the radio signals within an SSB burst period.

11. The controlling node of claim 10, wherein the processing circuitry is further configured to control one or more additional disjoint subsets of the antenna processing nodes to transmit SSBs having respective additional SSB identifiers.

12. The controlling node of claim 10, wherein the first subset and the second subset each include two or more antenna processing nodes, and wherein the processing circuitry is configured to control each member of the first subset to transmit the SSBs having the first SSB identifier on a different component carrier than all other members of the first subset; and control each member of the second subset to transmit the SSBs having the second SSB identifier on a different component carrier than all other members of the second subset.

13. The controlling node of claim 10, wherein the processing circuitry is further configured to:

receive, via one or more of the antenna processing nodes, a random access request from a wireless device; and select an antenna processing node for one or more subsequent transmissions by mapping a timeslot in which the random access request was transmitted to an SSB identifier, identifying at least one antenna processing node transmitting SSBs with that SSB identifier, and selecting the antenna processing node for subsequent transmissions from among the identified at least one antenna processing node.

14. The controlling node of claim 13, wherein the processing circuitry is configured to identify which component carrier was used by the wireless device to transmit the random access request and select the antenna processing node for one or more subsequent transmissions from among the identified at least one antenna processing nodes by selecting an antenna processing node that transmitted SSBs on the identified component carrier.

15. The controlling node of claim 13, wherein the processing circuitry is further configured to:

subsequently receive from the wireless device, via one or more of the antenna processing nodes, measurement reports corresponding to multiple channel-state-information (CSI) reference signal configurations, each of the multiple CSI reference signal configurations corresponding to a unique combination of SSB and antenna processing node beam shaping; and select a combination of antenna processing node and
  antenna processing node beam shaping, based on the
  received measurement reports.

* * * * *